UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

993,735.  Specification of Letters Patent.  Patented May 30, 1911.

No Drawing.  Application filed September 27, 1910.  Serial No. 583,995.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in Vat Dye, of which the following is a specification.

The present invention concerns the manufacture and production of new vat dyes which can be obtained by condensing polyhalogenated diarylsulfones with at least two molecules of an aminoanthraquinone.

The new dyes having probably the following general formula:

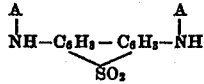

in which A means an anthraquinone substance are after being dried and pulverized dark powders soluble in quinolin with from an orange-red to blue color; soluble in concentrated sulfuric acid generally with a greenish color; yielding vats with hydrosulfite and caustic soda lye, dyeing cotton from red to violet to blue to green fast shades.

In order to illustrate the new process more fully the following example is given, the parts being by weight: A mixture of 5 parts of para-para¹-dichlorodiphenylsulfone:

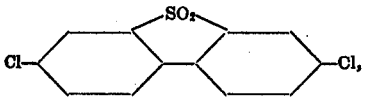

15 parts of 1-monobenzoylamino-4-aminoanthraquinone, 10 parts of anhydrous sodium acetate, 0.5 parts of $CuCl_2$ and 100 parts of naphthalene are heated to boiling during 10 hours until the quantity of the dye does no longer increase. Nitrobenzene is added, the new dye is filtered off from the liquid and washed with alcohol and then with hot water. It is a violet crystalline powder soluble in boiling quinolin with a blue, in concentrated sulfuric acid with a green color. Upon treatment with hydrosulfite and caustic soda lye a brown vat is obtained which dyes cotton dark green shades fast to boiling, light and chlorin.

The dye obtained from 3.3'-dichlorodiphenylsulfone+1-aminoanthraquinone dyes red, that obtained from 3.3'-dichlorodiphenylsulfone+monobenzoyl-1.4-diaminoanthraquinone dyes violet, that obtained from 4.4'-dichlorodiphenylsulfone and 1-aminoanthraquinone dyes brown-red.

I claim:—

1. The herein described new vat dyestuffs obtainable by condensing a dihalogendiarylsulfone with an aminoanthraquinone, having probably the following general formula:

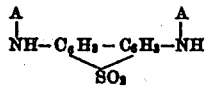

in which A means an anthraquinone substance which dyes are after being dried and pulverized dark powders soluble in quinolin with from an orange-red to blue color; being soluble in concentrated sulfuric acid generally with a green color; dyeing cotton from the vat from red to violet to blue to green shades, substantially as described.

2. The herein described new dye obtainable from para-para¹-dichlorodiphenylsulfone and two molecules of 1-monobenzoylamino-4-aminoanthraquinone,

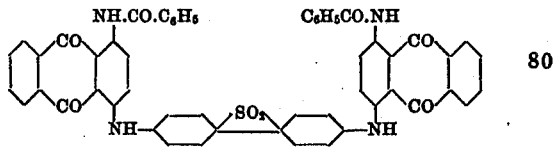

which is after being dried and pulverized a violet crystalline powder, soluble in boiling quinolin with a blue color, soluble in concentrated sulfuric acid with a green color; dyeing cotton from the hydrosulfite vat dark green shades fast to boiling, light and chlorin, substantially as described.

In testimony whereof I have hereunto set my hand in the presence of two subscribing witnesses.

PAUL THOMASCHEWSKI. [L. S.]

Witnesses:
CHAS. J. WRIGHT,
WALTER VANNEGUT.